(12) United States Patent
Klahold et al.

(10) Patent No.: US 6,742,753 B2
(45) Date of Patent: Jun. 1, 2004

(54) LOCKING DEVICE FOR A VEHICLE SEAT

(75) Inventors: Wolfgang Klahold, Herne (DE);
Joachim Flick, Hückeswagen (DE);
Michael Borbe, Rheinbach (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 0 days.

(21) Appl. No.: 10/406,104

(22) Filed: Apr. 3, 2003

(65) Prior Publication Data
US 2003/0168567 A1 Sep. 11, 2003

Related U.S. Application Data

(63) Continuation of application No. PCT/EP02/07769, filed on Jul. 12, 2002.

(30) Foreign Application Priority Data

Aug. 11, 2001 (DE) .......................... 101 39 630

(51) Int. Cl.⁷ .............................................. F16M 13/00
(52) U.S. Cl. ........................................ 248/429; 248/430
(58) Field of Search ................................ 248/429, 424, 248/419, 421, 423; 297/331, 344.1, 341

(56) References Cited

U.S. PATENT DOCUMENTS

| | | | | |
|---|---|---|---|---|
| 5,806,825 A | * | 9/1998 | Couasnon | 248/429 |
| 5,918,847 A | * | 7/1999 | Couasnon | 248/430 |
| 5,951,086 A | * | 9/1999 | Hoshino et al. | 296/65.03 |
| 6,113,051 A | | 9/2000 | Moradell et al. | |
| 6,123,379 A | * | 9/2000 | Yamada et al. | 296/65.03 |
| 6,126,133 A | | 10/2000 | Timon et al. | |
| 6,161,892 A | * | 12/2000 | Chabanne et al. | 296/65.03 |
| 6,227,596 B1 | * | 5/2001 | Foucault et al. | 296/65.13 |
| 6,328,272 B1 | * | 12/2001 | Hayakawa et al. | 248/429 |
| 6,513,868 B1 | * | 2/2003 | Tame | 297/341 |

FOREIGN PATENT DOCUMENTS

| | | |
|---|---|---|
| DE | 42 42 895 C1 | 11/1993 |
| DE | 198 11 094 A1 | 10/1999 |
| DE | 199 18 622 A1 | 11/1999 |
| EP | 0 845 384 A1 | 6/1998 |
| EP | 0 936 102 A1 | 8/1999 |
| FR | 2 759 330 A1 | 8/1998 |
| WO | WO 95/02520 A1 | 1/1995 |

\* cited by examiner

*Primary Examiner*—Leslie A. Braun
*Assistant Examiner*—Amy J. Sterling
(74) *Attorney, Agent, or Firm*—Alston & Bird LLP

(57) ABSTRACT

In a locking device for a vehicle seat, particularly a motor vehicle seat with a first component group (12, 16), having at least one locking element (14) for interacting with a first seat rail (5), being pretensioned and movably borne on a second seat rail (8), and a second component group (22, 28) being movably borne relative to the first component group (12, 16) on the second seat rail (8) and acting on the first component group (12, 16) when acted on by a manually operated unlocking element (34), and control elements (20, 26) for controlling the unlocking process of the first component group (12, 16), the component groups (12, 16, 22, 28) are each rigid, and the control elements (20, 26) are arranged between the first component group (12, 16) and the second component group (22, 28).

20 Claims, 2 Drawing Sheets

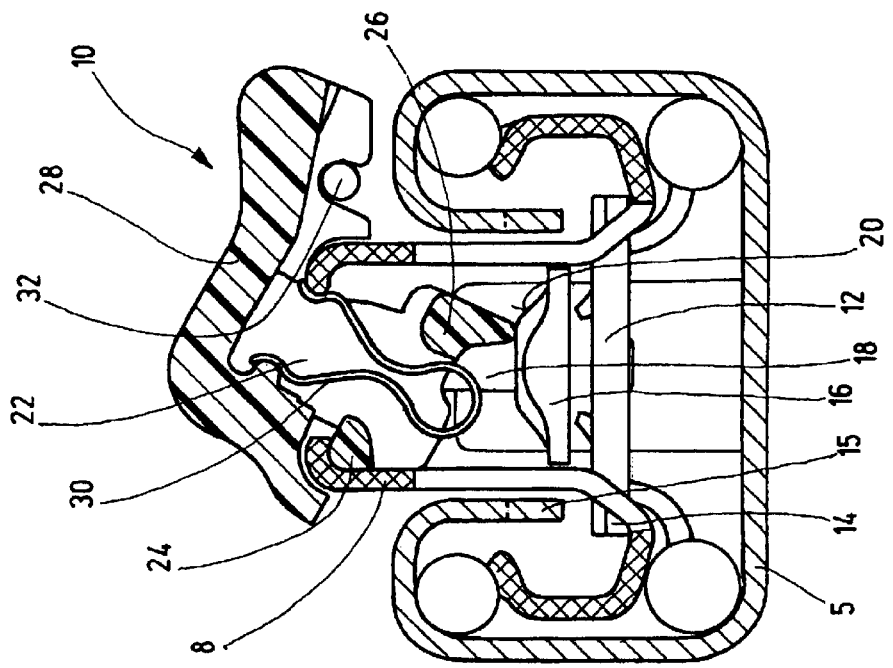
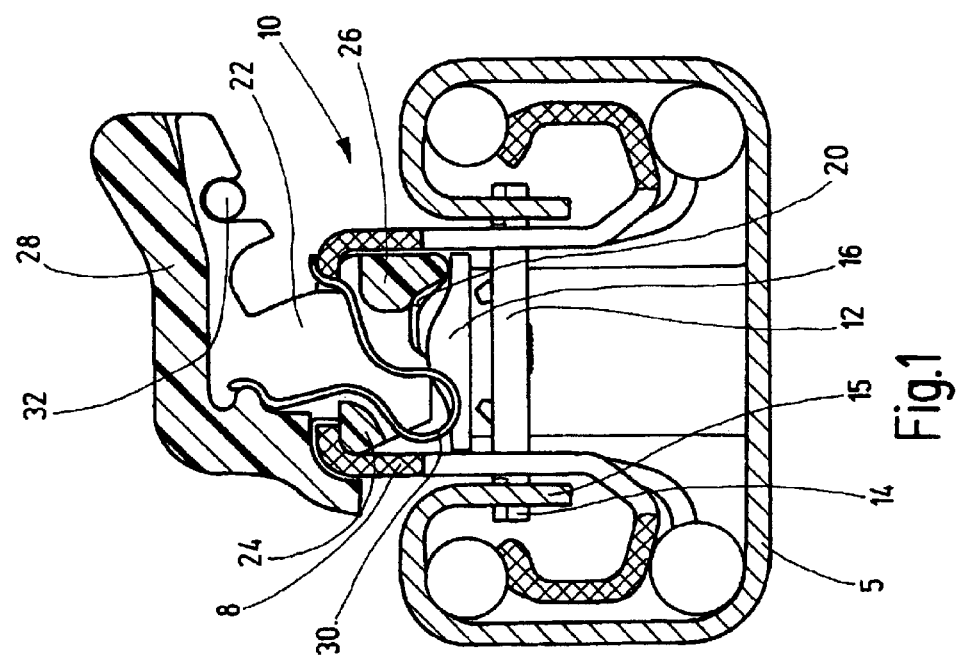

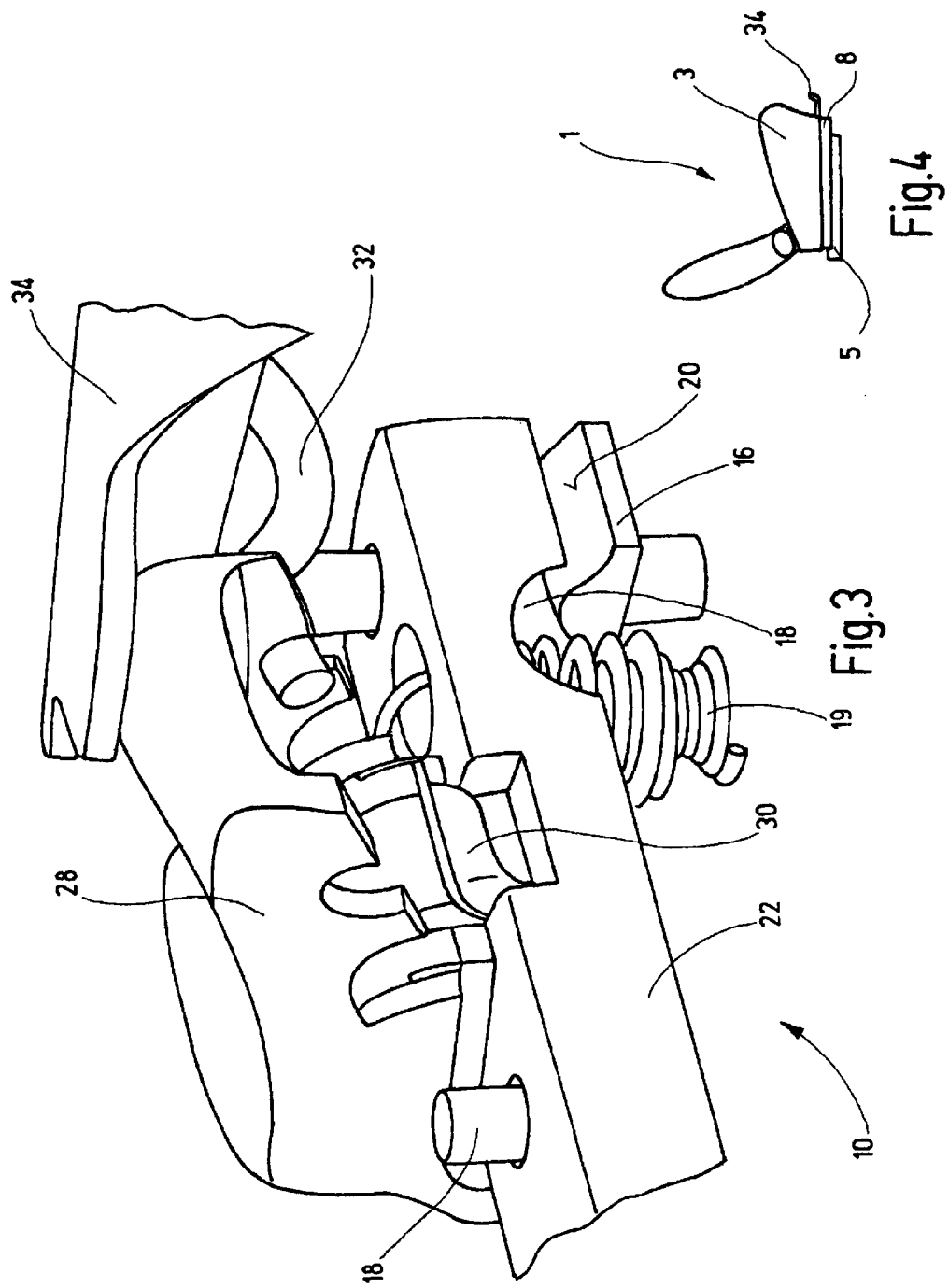

LOCKING DEVICE FOR A VEHICLE SEAT

CROSS-REFERENCE TO RELATED APPLICATION

This is a continuation of PCT/EP02/07769, which was filed Jul. 12, 2002, published in German, and is entirely incorporated herein by reference.

BACKGROUND OF THE INVENTION

The present invention concerns a locking device for a vehicle seat, particularly in an adjuster for a motor vehicle seat, including a first component group having at least one latch element for interacting with a first seat rail, with the first component group being movably borne, in a pretensioned manner, on a second seat rail; a second component group borne on the second seat rail for moving relative to the first component group, with the second component group acting on the first component group in response to the second component group being acted upon by a manually operated unlocking element; with control elements for controlling the unlocking process of the first component group.

In a locking device of the type described in the immediately preceding paragraph, known from DE 198 11 094 A1, a manually operated arm acts on a lever journaled in a support bearing fixed to the upper rail, with the lever lifting spring-loaded latches from openings in the lower rail. The shape of the support bearing and the bearing edge of the lever are chosen in such a way that they act as control elements influencing the activation process, particularly controlling the magnitude of the unlocking force to be applied.

BRIEF SUMMARY OF THE INVENTION

The object of the invention is to improve a locking device of the type described in the preceding section and particularly to facilitate the activation of same at a production cost that should ideally remain the same. According to the invention this object is achieved by a locking device for a vehicle seat, particularly a motor vehicle seat, with a rigid first component group including at least one latch element, wherein the first component group is borne by a first seat rail for moving relative to the first seat rail between locked and unlocked positions, with the latch element interacting with a second seat rail to restrict relative movement between the first and second seat rails while the first component group is in the locked position, the latch element allowing the relative movement between first and second seat rails while the first component group is in the unlocked position, and the first component group being biased toward the locked position; a rigid second component group borne by the second seat rail for moving relative to and acting upon the first component group in response to the second component group being acted upon by a manually movable unlocking element; control elements between the first and second component groups cause the first component group to move in a predetermined, controlled manner from the locked position to the unlocked position in response to the second component group acting upon the first component group.

By arranging the control elements between the first component group and the second component group, the function for controlling the unlocking force is separate from the bearing function. With a view to the different applications, the shape of the control elements can be more varied, particularly in order to reduce the overall required activation force and to influence its time course, without having to take the bearing function into account. Because the component groups are each rigid, no additional components are necessary for the interplay of component groups and control elements, these additional components being likely to increase the production costs and the total play.

The preferably pivotable second component group is preferably borne inside a mounting space defined by the second seat rail and is preferably pretensioned with respect to the second seat rail. As compared to the known bearing option outside the second seat rail, this requires less mounting space outside of it. The control element for interacting with the first component group is then also preferably arranged inside this mounting space at a distance from the bearing, whereas the component of the second component group interacting with the unlocking element is arranged outside the mounting space. The second component group can be made entirely of plastic, so that it is easy to manufacture even in a more complex version. Then, the second component group can be a monoblock or can be made of different parts which are connected with one another.

Preferably, the first component group has a sliding curve forming the control element, the sliding curve having different levels of depth extending in the direction of movement of the first component group, for example flatter or steeper sections. The force required for unlocking then depends on the shape of the sliding curve and the distance between the contact point of the second component group on this sliding curve and the bearing of the second component group.

BRIEF DESCRIPTION OF THE DRAWINGS

The invention is explained in greater detail with reference to an exemplary embodiment illustrated in the drawings, in which:

FIG. 1 is a section through the exemplary embodiment in a locked state,

FIG. 2 is a section through the exemplary embodiment in an unlocked state,

FIG. 3 is a partial perspective view of the second component group and several components that are in contact with same, and FIG. 4 is a schematic representation of a vehicle seat.

DETAILED DESCRIPTION OF THE INVENTION

A longitudinally adjustable vehicle seat 1 with a seat part 3 has one pair of seat rails on each side serving as a longitudinal adjuster. Each of the pairs consists of a lower rail 5 that is fixed to the vehicle structure and functions as a guide rail, and an upper rail 8 that is fixed to the seat part 3 and functions as a runner rail that slides in the lower rail. The lower rail 5 and the upper rail 8 are both constructed in a generally U-shaped manner and grip each other with their edges which are bent inward and outward, respectively. The seat rails also define the directional references used below.

A locking device 10 has three steel detent plates 12 which are horizontally arranged inside a mounting space defined by the upper rail 8. The detent plates 12 have on each side three teeth 14 protruding through openings in the side sections of the upper rail 8. To lock the upper rail 8 with the lower rail 5, the teeth 14 interact with U-shaped fixtures 15 opening downward and formed in the edges of the lower rail 5 which are bent inward. A push element 16 having a vertical steel guide bolt 18 is formed onto the upper side of each detent plate 12, or is firmly attached to it, being made of steel or plastic. The detent plate 12 is pretensioned in an upward direction towards the upper rail 8 by way of a spring 19 and is guided by way of the guide bolt 18 in the middle section of the upper rail 8 that is arranged at the top. This middle section also defines the upper side of the upper rail 8. Each detent plate 12 with its teeth 14 and the push element 16 forms a first component group that is rigid. In the locked state of the locking device 10, the detent plates 12 grip the lower rail 5, so that the seat rails cannot slide relative to one another.

On its upward-facing side, around the guide bolt 18, the push element 16 has a sliding curve 20 which has different depths with respect to the direction of movement of the push element 16 as defined by the guide bolts 18. A rotational transverse bar 22 made of plastic is arranged partially inside and partially above the mounting space defined by the upper rail 8, protruding through openings in the middle section of the upper rail 8. The rotational transverse bar 22 is borne in an upper corner area of the upper rail 8 by way of a bearing flange 24 formed on it and arranged along the upper rail 8 inside a mounting space defined by the upper rail 8. On the side opposite the bearing flange 24, with the rotational transverse bar comprises a control flange 26 extending in the longitudinal direction defined by the upper rail 8.

A pressure arm 28 made of plastic is fixedly attached to the rotational transverse bar 22, another option being that the pressure arm 28 would form one piece with the rotational transverse bar 22. The rotational transverse bar 22 and the pressure arm 28 form a second component group that is rigid. The pressure arm 28 is pretensioned by way of an arm spring 30 with respect to the upper rail 8, and by way of a torsion spring 32 loaded in an upward direction with respect to a seat part structure fixed transverse bar, i.e. the control flange 26, in a locked position of the locking device 10, is in the upper corner section of the upper rail 8 opposite the control flange 24, with the control flange 26 bearing against a lateral section of the sliding curve 20. An unlocking arm 34 having the function of an unlocking element is borne in a seat part structure fixed bearing. The unlocking arm 34 rests on the push arm 28 with a short lever, being arranged, for example, in the front section of the seat part 3 in a way that it can be reached by the user.

For unlocking, the unlocking arm 34 is manually pulled upward, thereby pressing the push arm 28 downward in such a way that the control flange 26 is moved downward. First, the control flange 26 slides over an ascending, steeper section of the respective sliding curves 20 of the detent plates 12, which may be arranged with different depths. By choosing the proper shape of the sliding curve 20, the force increase can be kept at a minimum. As soon as the respective detent plate 12 has been lifted out of its slots 15, i.e. has been pushed downward, away from the lower rail 5, the unlocking point is reached. Behind the unlocking point, the gradient of the sliding curve 20 decreases in a flat middle section, i.e. the transmission ratio decreases, with the result that less force will need to be applied by the user for unlocking.

That which is claimed:

1. A locking device for a vehicle seat, comprising:
 a rigid first component group including at least one latch element, wherein the first component group is borne by a first seat rail for moving relative to the first seat rail between locked and unlocked positions, with the latch element interacting with a second seat rail to restrict relative movement between the first and second seat rails while the first component group is in the locked position, the latch element allowing the relative movement between first and second seat rails while the first component group is in the unlocked position, and the first component group being biased toward the locked position; a rigid second component group borne by the second seat rail for moving relative to and acting upon the first component group in response to the second component group being acted upon by a manually movable unlocking element; control elements between the first and second component groups for causing the first component group to move in a predetermined, controlled manner from the locked position to the unlocked position in response to the second component group acting upon the first component group; wherein the second component group is pivotably borne on the second seat rail by way of a bearing, and wherein said bearing is located inside a mounting space defined by the second seat rail.

2. A locking device according to claim 1, wherein the second component group includes a control element of said control elements, and the control element of the second component group is a control flange that is located inside the mounting space defined by the second seat rail and is distant from said bearing.

3. A locking device according to claim 1, wherein the second component group includes a transverse bar that is borne by the second seat rail for rotating relative to the second seat rail, wherein a portion of the transverse bar is positioned in the mounting space defined by the second seat rail and another portion of the transverse bar is positioned outside of the mounting space defined by the second seat rail.

4. A locking device according to claim 1, wherein the second component group is pretensioned with respect to the second seat rail.

5. A locking device according to claim 1, wherein the second component group is made of plastic and is a monoblock or is made of several components.

6. A locking device according to claim 1, wherein the movement of the first component group from the locked position to the unlocked position is in a direction, the first component group includes a control element of said control elements, and the control element of the first component group is a sliding curve having different depths in said direction.

7. A locking device according to claim 6, wherein the sliding curve has flatter and steeper sections.

8. A locking device according to claim 1, wherein the locking device is in combination with the vehicle seat which is longitudinally adjustable.

9. A locking device according to claim 6, wherein the second component group includes a control element of said control elements, the control element of the second component group is a control flange that slides across the sliding curve to cause the first component group to move in the predetermined, controlled manner from the locked position to the unlocked position.

10. A locking device according to claim 2, wherein the second component group includes a transverse bar that is mounted for rotating relative to the second seat rail, wherein a portion of the transverse bar is positioned in the mounting space defined by the second seat rail and another portion of the transverse bar is positioned outside of the mounting space defined by the second seat rail.

11. A locking device according to claim 1, wherein the second component group is made of plastic.

12. A locking device according to claim 2, wherein the movement of the first component group from the locked position to the unlocked position is in a direction, the first component group includes a control element of said control elements, and the control element of the first component group is a sliding curve having different depths in said direction, and wherein the control flange slides across the sliding curve to cause the first component group to move in the predetermined, controlled manner from the locked position to the unlocked position.

13. A locking device according to claim 3, wherein the movement of the first component group from the locked position to the unlocked position is in a direction, the first component group includes a control element of said control elements, and the control element of the first component group is a sliding curve having different depths in said direction.

14. A locking device according to claim 4, wherein the movement of the first component group from the locked position to the unlocked position is in a direction, the first component group includes a control element of said control elements, and the control element of the first component group is a sliding curve having different depths in said direction.

15. A locking device according to claim 5, wherein the movement of the first component group from the locked position to the unlocked position is in a direction, the first component group includes a control element of said control elements, and the control element of the first component group is a sliding curve having different depths in said direction.

16. A locking device for a vehicle seat, comprising:
 a rigid first component group including at least one latch element, wherein the first component group is mounted to a first seat rail for moving relative to the first seat rail between locked and unlocked positions, with the latch element interacting with a second seat rail to restrict relative movement between the first and second seat rails while the first component group is in the locked position, the latch element allowing the relative movement between first and second seat rails while the first component group is in the unlocked position, and the first component group being biased toward the locked position; a rigid second component group including a bearing located inside a mounting space defined by the second seat rail so that the second component group is pivotably borne on the second seat rail for pivoting relative to the first component group and acting upon the first component group; control elements between the first and second component groups for causing the first component group to move in a predetermined, controlled manner from the locked position to the unlocked position in response to the second component group acting upon the first component group.

17. A locking device according to claim 16, wherein the movement of the first component group from the locked position to the unlocked position is in a direction, the first component group includes a control element of said control elements, the control element of the first component group is a sliding curve having different depths in said direction, the second component group includes a control element of said control elements, the control element of the second component group is a control flange that slides across the sliding curve to cause the first component group to move in the predetermined, controlled manner from the locked position to the unlocked position.

18. A locking device for a vehicle seat, comprising:
 a rigid first component group including at least one latch element, wherein the first component group is mounted to a first seat rail for moving relative to the first seat rail between locked and unlocked positions, with the latch element interacting with a second seat rail to restrict relative movement between the first and second seat rails while the first component group is in the locked position, the latch element allowing the relative movement between first and second seat rails while the first component group is in the unlocked position, and the first component group being biased toward the locked position; and
 a rigid second component group including a bearing located inside a mounting space defined by the second seat rail so that the second component group is pivotably borne on the second seat rail for pivoting relative to the first component group so that a surface of the second component group slides across a surface of the first component group to cause the first component group to move in a predetermined, controlled manner from the locked position to the unlocked position.

19. A locking device according to claim 1, wherein:
 the first component group includes:
  a detent plate which includes the latch element and moves with the first component group relative to the first seat rail between the locked and unlocked positions, and
  a pushable element which is connected to the detent plate and moves with the first component group relative to the first seat rail between the locked and unlocked positions;
 the second component group includes:
  a transverse bar that is borne by the second seat rail for rotating relative to the second seat rail, wherein a portion of the transverse bar is positioned in the mounting space defined by the second seat rail and another portion of the transverse bar is positioned outside of the mounting space defined by the second seat rail, and
  an arm which extends from the transverse bar and is for being moved to cause the transverse bar to rotate relative to the second sear rail;
 said bearing is part of the transverse bar;
 the transverse bar includes a control element of said control elements, and the control element of the transverse bar is a control flange that is located inside the mounting space defined by the second seat rail and is distant from said bearing;
 the movement of the first component group from the locked position to the unlocked position is in a direction;
 the pushable element includes a control element of said control elements, and the control element of the pushable element is a sliding curve having different depths in said direction; and
 the control flange and the sliding curve are arranged so that rotating of the transverse bar relative to the second seat rail causes the control flange to slide across the sliding curve, which causes the first component group to move in the predetermined, controlled manner from the locked position to the unlocked position.

20. A locking device according to claim 18, wherein:
 the first component group includes:
  a plate which includes the latch element and moves with the first component group relative to the first seat rail between the locked and unlocked positions, and
  a pushable element which is connected to the plate and moves with the first component group relative to the first seat rail between the locked and unlocked positions;

the second component group includes:
- a bar that is borne by the second seat rail for rotating relative to the second seat rail, wherein a portion of the bar is positioned in the mounting space defined by the second seat rail and another portion of the bar is positioned outside of the mounting space defined by the second seat rail, and
- an arm which extends from the bar and is for being moved to cause the bar to rotate relative to the second sear rail;

said bearing is part of the bar;

the bar includes said surface of the second component group;

the pushable element includes said surface of the first component group;

the movement of the first component group from the locked position to the unlocked position is in a direction;

said surface of the first component group has different depths in said direction; and said surface of the first component group and said surface of the second component group are arranged so that rotating of the bar relative to the second seat rail causes said surface of the second component group to slide across said surface of the first component group, which causes the first component group to move in the predetermined, controlled manner from the locked position to the unlocked position.

* * * * *